United States Patent [19]
Scott

[11] Patent Number: 5,134,762
[45] Date of Patent: Aug. 4, 1992

[54] COMBINATION ALIGNMENT CYLINDER BORING AND DECK MILLING DEVICE

[75] Inventor: Jimmie D. Scott, Cedar Rapids, Iowa

[73] Assignee: Kwik-Way Manufacturing Co., Marion, Iowa

[21] Appl. No.: 652,542

[22] Filed: Feb. 8, 1991

[51] Int. Cl.$^5$ ............................................. B23C 1/10
[52] U.S. Cl. .................................... 29/26 A; 408/88; 409/192; 409/213
[58] Field of Search ............ 29/26 A, 26 R; 409/211, 409/213, 216, 192; 408/35, 88

[56] References Cited

U.S. PATENT DOCUMENTS

| | | | |
|---|---|---|---|
| 2,227,410 | 12/1940 | Johnson | 409/213 X |
| 3,735,459 | 5/1973 | Allen | 409/211 X |
| 4,516,311 | 5/1985 | Takakuwa et al. | 29/568 |
| 4,534,093 | 8/1985 | Jahnke et al. | 29/26 A |
| 4,564,995 | 1/1986 | Kase | 29/563 |
| 4,911,589 | 3/1990 | Winkler et al. | 409/235 |

FOREIGN PATENT DOCUMENTS

| | | | |
|---|---|---|---|
| 806510 | 6/1951 | Fed. Rep. of Germany | 29/26 A |
| 237807 | 7/1986 | Fed. Rep. of Germany | 29/568 |
| 0157412 | 12/1980 | Japan | 408/31 |
| 0110507 | 6/1984 | Japan | 409/231 |

Primary Examiner—Z. R. Bilinsky
Attorney, Agent, or Firm—Hill, Van Santen, Steadman & Simpson

[57] ABSTRACT

A combination cylinder boring and deck milling machine that has horizontal and vertical tools that can be used for drilling or machining a work piece.

1 Claim, 2 Drawing Sheets

COMBINATION ALIGNMENT CYLINDER BORING AND DECK MILLING DEVICE

BACKGROUND OF THE INVENTION

1. Field of the Invention

This invention relates in general to a combination aligning cylinder boring and deck milling apparatus.

2. Description of Related Art

Generally, in the prior art, separate tools have been utilized for vertically and horizontally drilling and machining. U.S. Pat. No. 4,564,995 and U.S. Pat. No. 4,516,311 illustrate milling and drilling devices. See also German Patent 237,807 of May 31, 1985, Japanese Patent Abstract No. 59-110507 and Japanese 55-157412.

SUMMARY OF THE INVENTION

The present invention relates to a combination aligning cylinder boring and deck milling device which has a base with a rotatable table mounted thereon and with a supporting means which is moveable longitudinally of the base and carries a vertically moveable tool holder. The tool holder comprises a motor which is connected to drive a vertical tool and simultaneously to drive a horizontally mounted tool.

A feature of the present invention is to provide a single machine capable of boring horizontally or vertically and/or milling on two different axes.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

DESCRIPTION OF THE PREFERRED EMBODIMENTS

Figure 1:
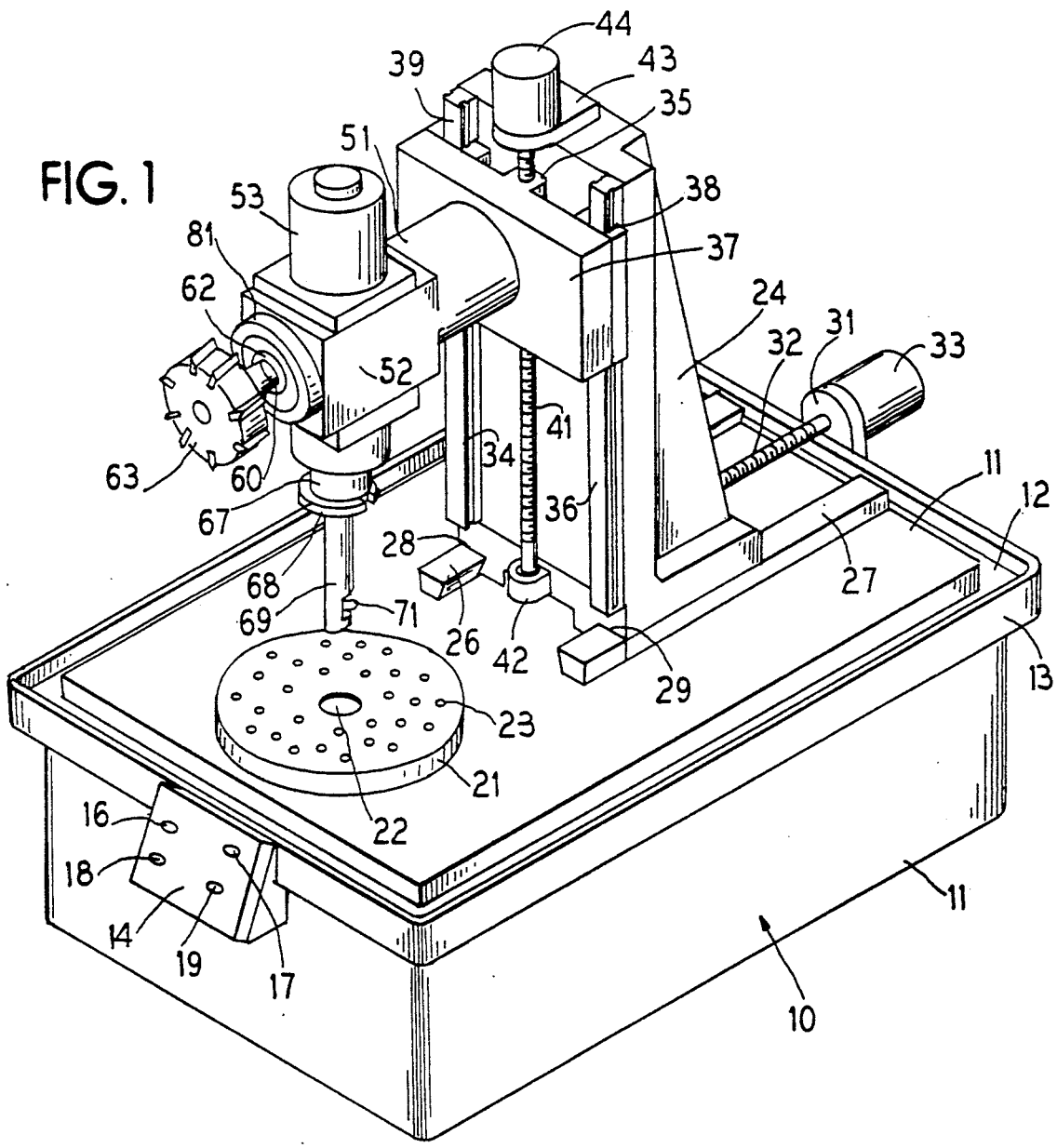
FIG. 1 is a perspective view of the invention.

The FIGS. illustrate a combination machine 10 which includes a base 11 with an upper surface 11 about which a groove 12 and an outer rim 13 are formed as illustrated in FIG. 1, for example. A pair of horizontal guides 26 and 27 are mounted in a parallel arrangement on the top of the surface 11 and an upright support 24 has ways 28 and 29 which ride on the guides 26 and 27. A bracket 31 supports a motor 33 from which extends a rotatable lead screw 32 that is threadedly received in a collar 20 connected to the upright member 24 as shown in FIG. 2 so that as the motor rotates the shaft 32, the member 24 can be moved to the right or left relative to FIG. 2.

Figure 2:
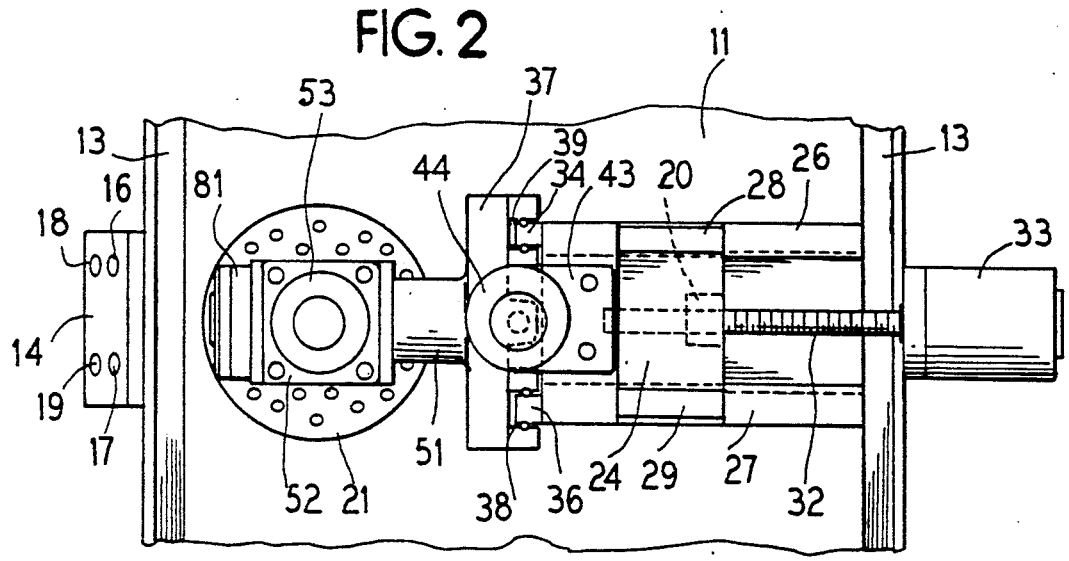
FIG. 2 is a top partially cut-away view.
Figure 3:
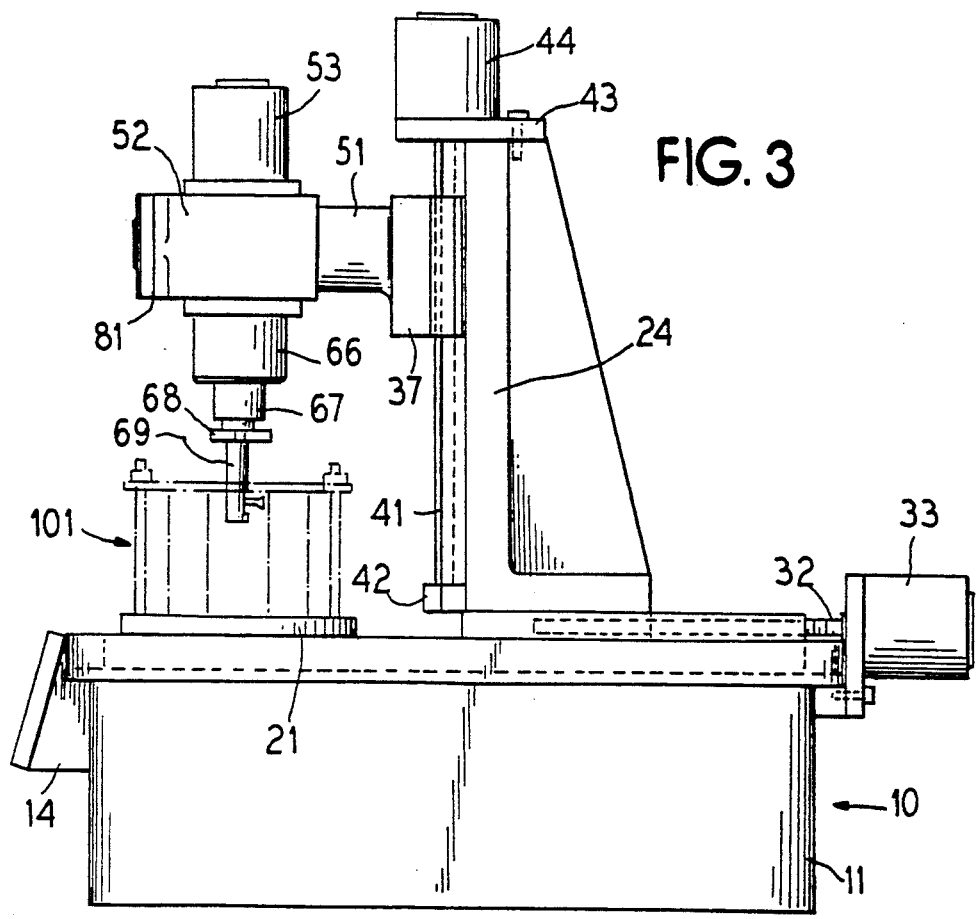
FIG. 3 is a side plan view of the invention.

A pair of vertical guides 34 and 36 are mounted on a horizontal front surface 30 and a tool head support 37 is formed with ways 38 and 39 which ride on the guides 34 and 36 with suitable bearings mounted therebetween as shown in FIG. 2. The ways 38 and 39 are attached to the tool support 37 which also has a threaded portion 35 which receives a vertical lead screw 41 which has its lower end supported by a bearing 42 from member 24 and its upper end is connected to a motor 44 which is supported by a bracket 43 from the member 24. Rotation of the lead screw 41 by the motor 44 moves the tool support head 37 up and down relative to the member 24.

Figure 4:
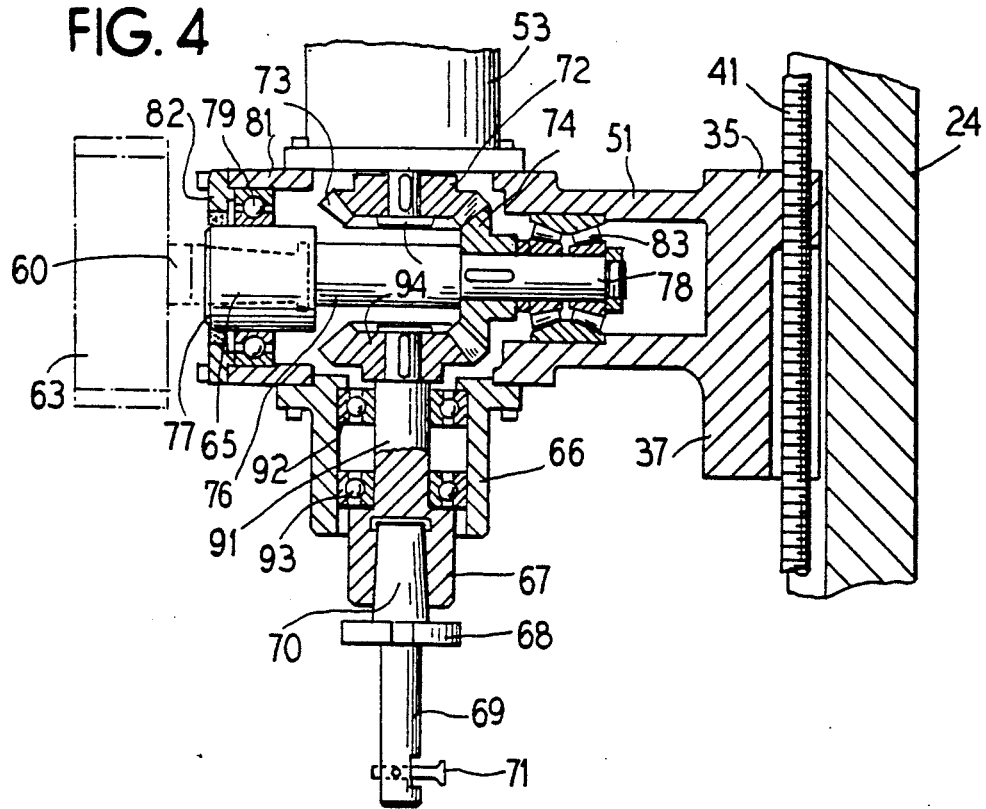
FIG. 4 is a sectional view through the milling head of the invention.

Extending from the tool support 37 is a cylindrical portion 51 to which a motor 53 is attached with suitable bolts as shown in FIGS. 2 and 4 to an outer portion 52. A lower collar 66 extends from the portion 52 and rotatably supports a chuck 67 adapted to receive the end 70 of a tool 69 which carries a cutting tool 71 in one end as shown in FIG. 4. A collar 68 is formed on the tool 69 to allow the tool to be inserted into the chuck 67.

A horizontally extending tool 60 has a shaft portion 65 which is receivable in a horizontal chuck 77. The tool 60 has a cutter 63 on its outer end although it is to be realized that tool 68 may also be a horizontally mounted drill.

The motor 53 drives both the tools 69 and 60 through the mechanism shown in FIG. 4. The motor 53 has an output shaft 72 that carries a bevel gear 73 that mates with a bevel gear 74 mounted on a shaft 78 rotatably supported in the member between portion 51 by bearing 83 and an output portion 81 that has a bearing 79 that rotatably supports the chuck 77. The chuck 77 is connected by a shaft 76 to the shaft 78 which is rotatably supported by the bearings 83 between the member 51 and the shaft 78 as shown. A shaft 91 is rotatably supported by bearings 92 and 93 from a lower extending collar 66 of member 52. The shaft 91 carries the chuck 67 as shown in FIG. 4 and its upper end carries a bevel gear 94 which meshes with the bevel gear 74.

When the motor 53 is energized, its output shaft 72 turns the bevel gear 73 which drives the bevel gear 74 to rotate the horizontal shaft 78 and the chuck 77 thus to drive the horizontal tool 60. Simultaneously, the bevel gear 74 drives the bevel gear 94 which drives the shaft 91 to drive the chuck 67 and, thus, drive the tool 69 which rotates on a vertical axis.

The base 11 has a control panel 14 which carries control switches 16, 17, 18 and 19 to respectively turn on the power to the device and respectively control operation of the motors 33, 44 and 53. The motors 33 and 44 are energized to position the member 24. The motor 44 controls the vertical position of the member 37 relative to the machine and the workpiece and the motor 53 is controlled to drive the tools 69 and 60.

The turntable 21 is formed with partially extending bearings 23 and is supported on a vertical shaft 22 to allow the turntable 21 to be rotated if desired. The bearings 23 allow a workpiece to be easily moved on the turntable 21. The invention allows cutting and milling in two directions in the vertical and horizontal planes with a single machine.

In operation, on-off switch 16 is turned and a work piece 101 is positioned on the turntable 21 and for use of the vertical tool 69, the upright support 24 is positioned on the guides 26 and 27 by operation of the motor 33 using the operating switch 17 which can be moved from a center position to move member 24 back and forth.

Then tool support 37 is moved to position it relative to the work piece by actuating motor 52 by switch 18 which can be moved from a central off position to up and down positions. Then for cutting with tool 69, motor 53 can be energized. The tool 69 can be advanced downwardly by switch 18.

To use tool 60, the tool 60 is positioned relative to the work piece by motors 33 and 44 and then the tool is driven by motor 53.

Although the invention has been described with respect to preferred embodiments, it is not to be so limited as changes and modifications can be made which are within the full intended scope of the invention as defined by the appended claims.

We claim as our invention:

1. A combination cylinder boring and deck milling machine comprising, a base, a pair of parallel guides mounted on said base, an upright support member moveably mounted on said pair of parallel guides, a first motor coupled to said upright support to position it on said parallel guides, an up and down moveable tool support mounted on said upright support, a second motor coupled to move said up and down moveable tool support on said upright support member, a vertical tool rotatably mounted in said up and down tool support, a horizontal tool rotatably mounted in said up and down tool support, and a third motor connected to said vertical and horizontal tools to drive them, and wherein said third motor has a vertical output shaft and is mounted on said up and down tool support above said vertical and horizontal tools, a differential connected to receive said vertical output shaft of said third motor and having a first output connected to said vertical tool to drive it and having a second output connected to said horizontal tool to drive it.

* * * * *